US008379970B2

(12) United States Patent
Woo et al.

(10) Patent No.: US 8,379,970 B2
(45) Date of Patent: Feb. 19, 2013

(54) METHOD OF PROVIDING CONTENTS USING COLOR MARKER AND SYSTEM FOR PERFORMING THE SAME

(75) Inventors: Woon-Tack Woo, Gwangju (KR); Won-Woo Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 1013 days.

(21) Appl. No.: 12/018,015

(22) Filed: Jan. 22, 2008

(65) Prior Publication Data

US 2008/0175472 A1 Jul. 24, 2008

(30) Foreign Application Priority Data

Jan. 22, 2007 (KR) .................. 10-2007-0006668

(51) Int. Cl.
*G06K 9/00* (2006.01)
(52) U.S. Cl. ....................................... 382/162
(58) Field of Classification Search .................. None
See application file for complete search history.

(56) References Cited

U.S. PATENT DOCUMENTS

| 5,278,946 | A | * | 1/1994 | Shimada et al. ................ 706/53 |
| 5,416,312 | A | * | 5/1995 | Lamoure ....................... 235/494 |
| 5,473,536 | A | * | 12/1995 | Wimmer ........................ 700/90 |
| 5,729,731 | A | * | 3/1998 | Yajima et al. ..................... 1/1 |
| 5,995,102 | A | * | 11/1999 | Rosen et al. ................... 715/856 |
| 6,121,951 | A | * | 9/2000 | Kawabata et al. ............. 715/764 |
| 6,310,634 | B1 | * | 10/2001 | Bodnar et al. ................. 715/854 |
| 6,523,024 | B1 | * | 2/2003 | Yajima et al. ..................... 1/1 |
| 6,556,690 | B1 | * | 4/2003 | Nelson ........................... 382/100 |
| 6,704,748 | B1 | * | 3/2004 | Suganuma ..................... 707/706 |
| 6,731,786 | B2 | * | 5/2004 | Jones et al. .................... 382/135 |
| 6,963,668 | B2 | * | 11/2005 | Engeldrum et al. ........... 382/233 |
| 7,120,296 | B2 | * | 10/2006 | Shimoyama ................... 382/165 |
| 7,239,718 | B2 | * | 7/2007 | Park et al. ...................... 382/103 |
| 7,551,780 | B2 | * | 6/2009 | Nudd et al. .................... 382/190 |
| 7,671,874 | B2 | * | 3/2010 | Daignault, Jr. ................ 345/619 |
| 7,726,570 | B2 | * | 6/2010 | Tsai ............................... 235/454 |
| 2002/0054350 | A1 | * | 5/2002 | Kakigi et al. ................ 358/1.16 |
| 2003/0161529 | A1 | * | 8/2003 | Shimoyama ................... 382/165 |
| 2005/0216866 | A1 | * | 9/2005 | Rosen et al. ................... 715/856 |
| 2006/0159370 | A1 | * | 7/2006 | Tanaka et al. ................. 382/305 |
| 2007/0288305 | A1 | * | 12/2007 | Ozawa et al. .................. 705/10 |

FOREIGN PATENT DOCUMENTS

| JP | 2001320573 A | 11/2001 |
| JP | 2004145612 A | 5/2004 |

OTHER PUBLICATIONS

Kato, H., et al., "Virtual Object Manipulation on a Table-Top AR Environment", In Proc. of the International Symposium on Augmented Reality, pp. 111-119, 2000.
Billinghurst, M., et al., "The MagicBook—Moving Seamlessly between Reality and Virtuality", May/Jun. 2001, 2001 IEEE, pp. 2-4.
Fiala, M., ARTag Revision 1. A Fiducial Marker System Using Digital Techniques, National Research Council of Canada, Nov. 2004.

* cited by examiner

*Primary Examiner* — Samir Ahmed

(57) ABSTRACT

The present invention relates to a color marker recognizing device using a color marker. The color marker recognizing device includes a coloring unit and a content unit. The coloring unit acquires a sub marker image from color marker images according to contextual information on a user. The content unit outputs a first content demand signal that requests to display a first content corresponding to the sub marker image acquired by the coloring unit. Since the color marker recognizing device uses the color marker, it is possible to provide personalized content services.

19 Claims, 4 Drawing Sheets

[FIG. 1]
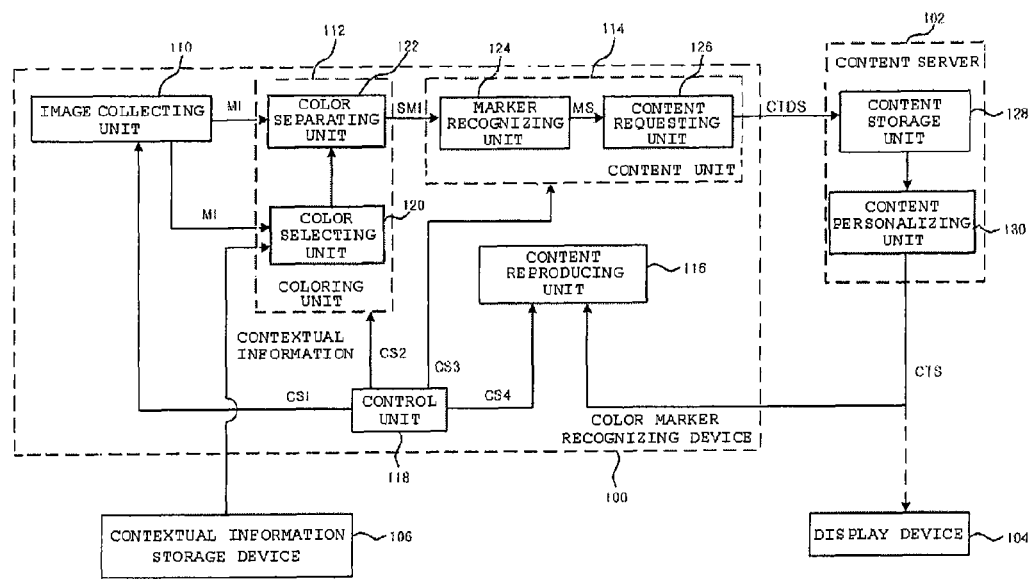

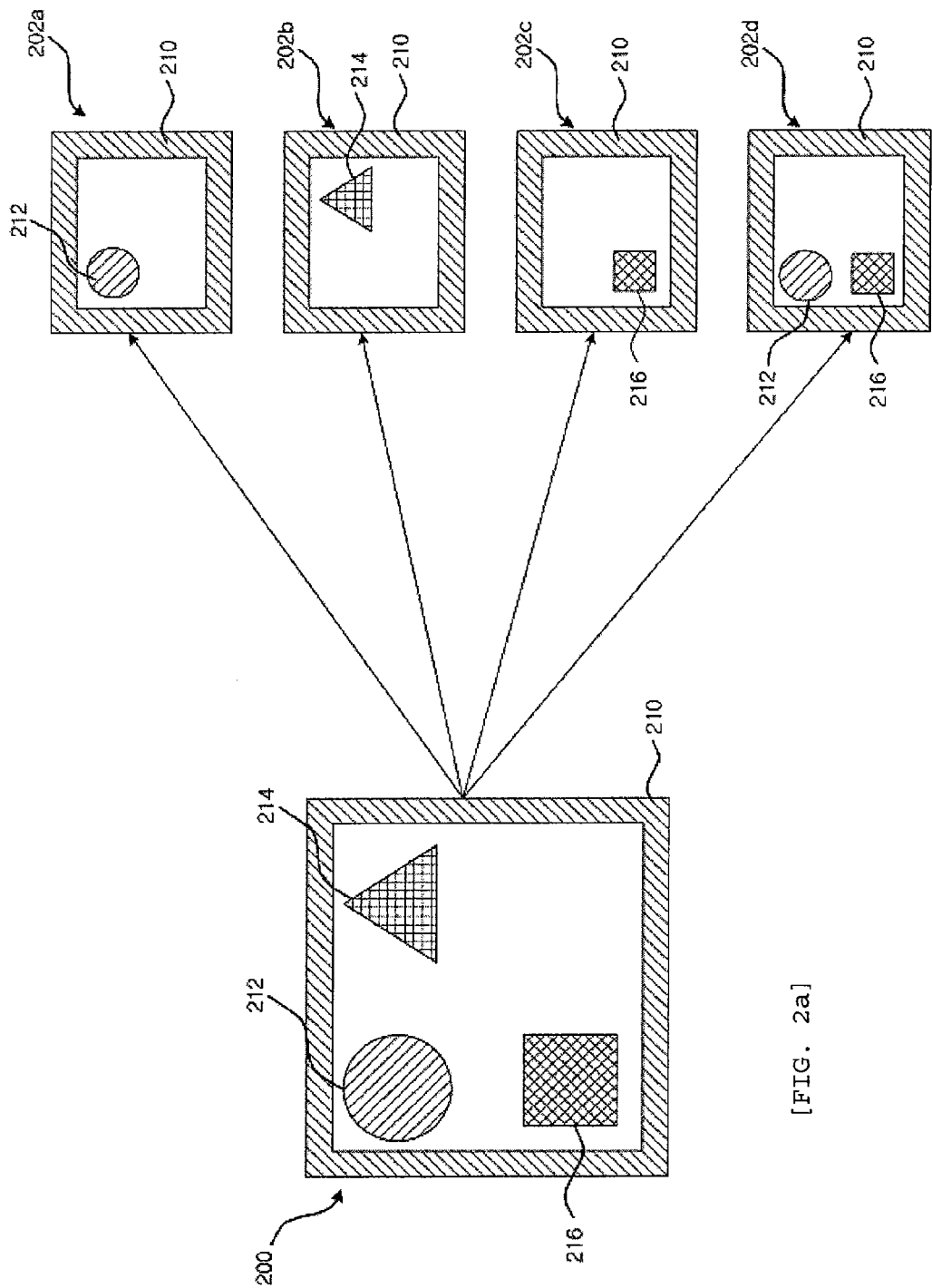

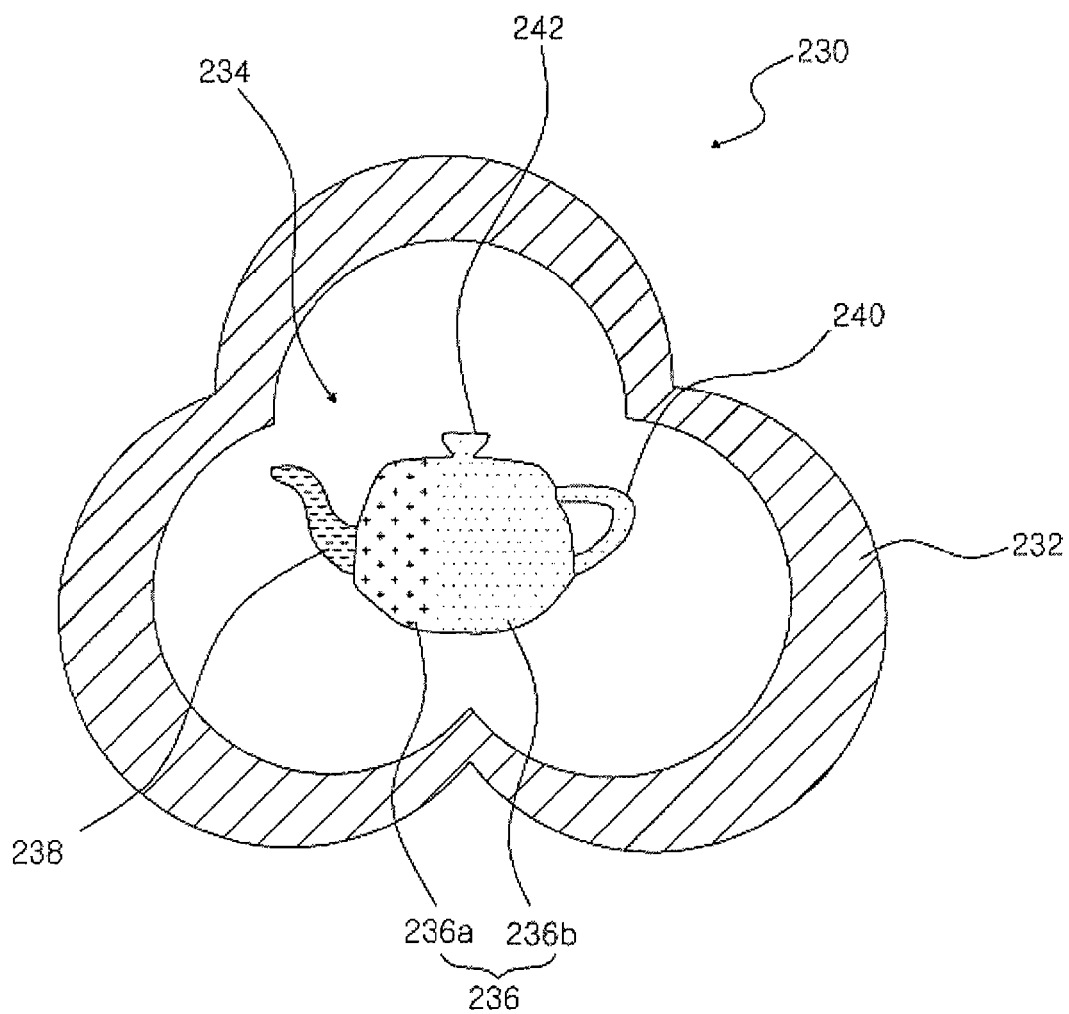
[FIG. 2b]

[FIG. 3]
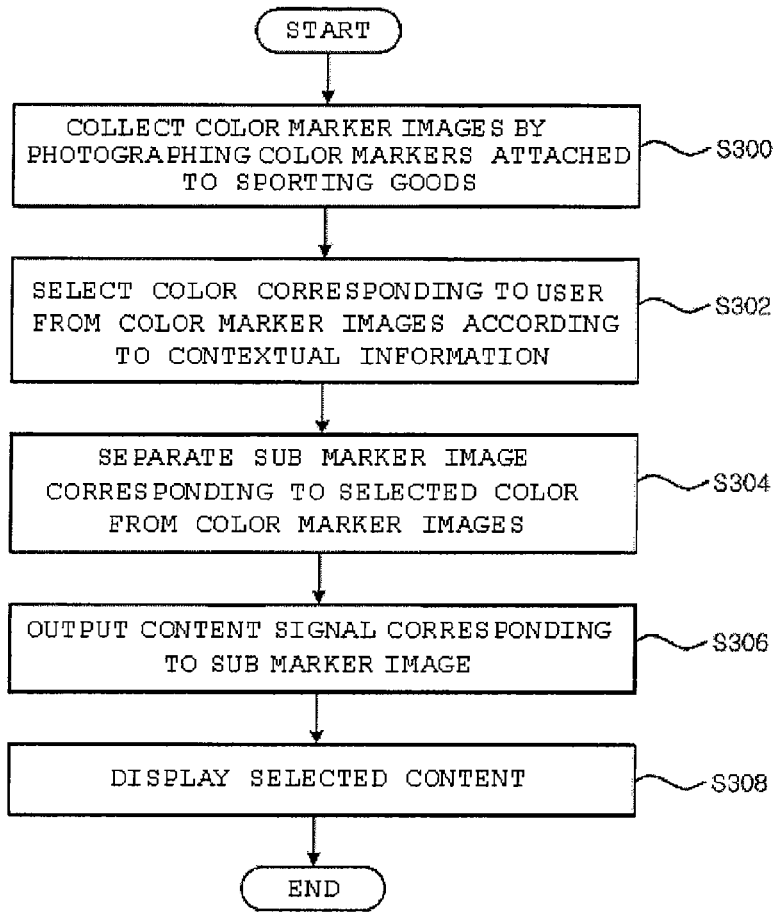
[FIG. 4]
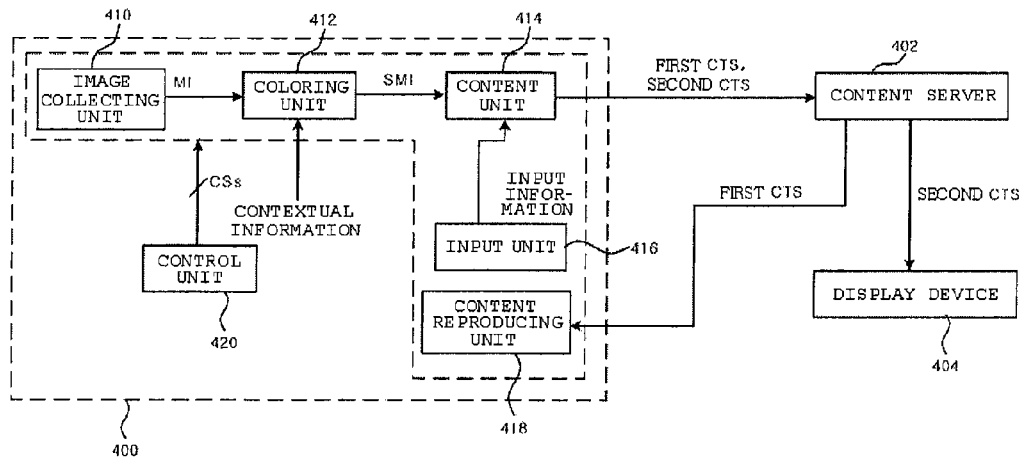

METHOD OF PROVIDING CONTENTS USING COLOR MARKER AND SYSTEM FOR PERFORMING THE SAME

BACKGROUND OF THE INVENTION

1. Technical Field

The present invention relates to a method of providing contents and a system for performing the same, and more particularly, to a method of providing contents using a color marker and a system of performing the same.

2. Related Art

In an existing augmented reality field, a black-and-white marker has been mainly used in order to provide contents. As a result, a system for providing contents according to the related art cannot provide individual content services for many persons because of characteristics of the white-and-black marker. That is, the system for providing contents cannot provide a personalized service for each person and provides uniform services for an unspecified number of users in consideration of a simple element, such as ages of the users. In recent years, however, a personalized augmented reality service becomes important, and accordingly, the method of providing contents and the system for performing the same according to the related art are no longer effective in the augmented reality field.

SUMMARY OF THE INVENTION

The invention has been finalized in order to solve the above-described problems. It is an object of the invention to provide a method of providing contents and a system for performing the same that are capable of providing a personalized content service.

According to an aspect of the invention, a color marker recognizing device includes a coloring unit and a content unit. The coloring unit acquires a sub marker image from color marker images according to contextual information on a user. The content unit outputs a first content demand signal requesting to display a first content corresponding to the sub marker image acquired by the coloring unit.

According to another aspect of the invention, a content server includes a content storage unit and a content personalizing unit. The content storage unit stores one or more contents. The content personalizing unit selects a first content corresponding to a first content demand signal from the contents stored in the content storage unit. In this case, the first content demand signal includes information on a sub marker image that is acquired from a color marker image according to contextual information on a user.

According to still another aspect of the invention, there is provided a method of providing contents using a color marker. The method includes collecting color marker images, acquiring a sub marker image corresponding to a user from the collected color marker images according to contextual information on the user, and displaying a first content corresponding to the acquired sub marker image.

Since the method of providing contents and the system for performing the same use a color marker according to the aspects of the invention, it is possible to provide personalized content services.

Further, since the method of providing contents and the system for performing the same can change a content set using the color marker to another content, it is possible to provide various content services using one color marker.

BRIEF DESCRIPTION OF THE DRAWINGS

FIG. 1 is a block diagram illustrating a system for providing contents using a color marker according to an embodiment of the invention;

FIGS. 2A and 2B are plan views illustrating color markers according to an embodiment of the invention;

FIG. 3 is a flowchart illustrating an operation process of a system for providing contents according to an embodiment of the invention; and FIG. 4 is a block diagram illustrating a system for providing contents according to another embodiment of the invention.

DESCRIPTION OF EXEMPLARY EMBODIMENT

Hereinafter, exemplary embodiments of the invention will be described in detail with reference to the accompanying drawings.

FIG. 1 is a block diagram illustrating a system for providing contents using a color marker according to an embodiment of the invention, and FIGS. 2A and 2B are plan views illustrating color markers according to an embodiment of the invention.

Referring to FIG. 1, a system for providing contents according to an embodiment of the invention includes a color marker recognizing device 100, a content server 102, and a display device 104.

In the description below, a color marker will be first described before describing components of the system for providing contents.

As shown in FIGS. 2A and 2B, color markers 200 and 230 include color marker frames 210 and 232 and one or more FIGS. 212, 214, 216, and 234 that are disposed in regions surrounded by the color marker frames 210 and 232.

The color marker frames 210 and 232 distinguish the color markers 200 and 230 from each other on the basis of a color outside the color markers 200 and 230, that is, a background color. The color marker frames 210 and 232 may have various shapes, as shown in FIGS. 2A and 2B.

Each of the FIGS. 212, 214, 216, and 234 may have various shapes without being limited to a specific shape. Each of the FIGS. 212, 214, 216, and 234 may have one color as a whole, as shown in FIG. 2A, and may have a different color for each of portions 236a, 236b, 238, 240, and 242, as shown in FIG. 2B. That is, each of the FIGS. 212, 214, 216, and 234 may have one or more colors.

Next, the operation of components of the system for providing contents will be described in detail on the basis of the color markers 200 and 230.

The color marker recognizing device 100 can recognize the color markers 200 and 230 that are attached to external objects, for example, sporting goods, and photographs the color markers 200 and 230 and collects color marker images (MI). Then, the color marker recognizing device 100 acquires a sub marker image (SMI) corresponding to a user who uses the color marker recognizing device 100 from the collected color marker images (MI), and transmits, to the content server 102, a content demand signal (CTDS) that requests to provide a first content corresponding to the acquired sub marker image (SMI). Here, the content demand signal (CTDS) may include not only information for the sub marker image (SMI) but also positional information of the content server 102.

According to this embodiment, the color marker recognizing device 100 is a mobile communication terminal that has an image collecting device, such as a camera, attached thereto.

The content server 102 is connected to the color marker recognizing device 100 through a predetermined communication network, and includes a content storage unit 128 and a content personalizing unit 130. Here, the communication network is not limited to a specific network, and all of general networks may be used as the communication network.

The content storage unit 128 stores various contents, and selects a second content corresponding to the sub marker image (SMI) from the stored contents in response to the content demand signal (CTDS) transmitted from the color marker recognizing device 100.

The content personalizing unit 130 converts the second content selected by the content storage unit 128 into the first content which the user desires, and outputs a content signal (CTS) including the first content. Here, the output content signal (CTS) is transmitted to the color marker recognizing device 100 or the display device 104.

The color marker recognizing device 100 or the display device 104 displays the first content included in the content signal (CTS) and provides a personalized content service for the user, which will be described in detail below with reference to the accompanying drawings.

In the above description, the content server 102 converts the second content into the first content. However, the content server 102 may directly select the first content from the contents stored in the content storage unit 128 according to the content demand signal (CTDS) without performing the content conversion process and output the selected first content.

Hereinafter, the components of the color marker recognizing device 100 will be described in detail.

Referring back to FIG. 1, the color marker recognizing device 100 includes an image collecting unit 110, a coloring unit 112, a content unit 114, a content reproducing unit 116, and a control unit 118.

The image collecting unit 110 photographs the color markers 200 and 230, collects the color marker images (MI), and transmits the collected color marker images (MI) to the coloring unit 112.

The coloring unit 112 includes a color selecting unit 120 and a color separating unit 122.

The color selecting unit 120 receives the color marker images (MI) from the image collecting unit 110, and receives contextual information on the user who uses the color marker recognizing device 100 from a contextual information storage device 106. Then, the color selecting unit 120 selects one or more colors corresponding to the user from the colors of the color marker images (MI) according to the received contextual information, and provides the color selection result to the color separating unit 122. In this case, the contextual information is information on preference and a living body of the user, and may be stored in advance in the contextual information storage device 106 or directly extracted through a sensor that is attached to the body of the user. According to another embodiment of the invention, the contextual information may not be received from the contextual information storage device 106 but may be stored in advance in a memory (not shown) of the color marker recognizing device 100. The contextual information is transmitted to the color selecting unit 120 in synchronization with a process of collecting images by the image collecting unit 110.

The color separating unit 122 separates a figure having the selected color from the color marker images (MI) according to the color selection result that is provided by the color selecting unit 120, and acquires a specific sub marker image (SMI). For example, as shown in FIG. 2A, the color separating unit 122 acquires a sub marker image (SMI), for example, a sub marker image 202a corresponding to the selected color among sub marker images 202a to 202d that can be separated from the color marker image (MI).

The content unit 114 includes a marker recognizing unit 124 and a content requesting unit 126.

The marker recognizing unit 124 recognizes which content corresponds to the sub marker image (SMI) transmitted from the color separating unit 122 using a specific matching method, such as template matching, and transmits a marker signal (MS) including the recognized result to the content requesting unit 126.

The content requesting unit 126 transmits, to the content server 102, the content demand signal (CTDS) that requests to transmit a content corresponding to the sub marker image (SMI) according to the marker signal (MS) transmitted from the marker recognizing unit 124. In this case, the content requesting unit 126 detects positional information of the content server 102 according to the marker signal (MS), and transmits the content demand signal (CTDS) including the positional information to the content server 102. The positional information of the content server 102 may be stored in the color marker recognizing device 100 and provided to the color marker recognizing device 100 from an external device (not shown).

The content reproducing unit 116 displays the first content included in the content signal (CTS) transmitted from the content server 102 such that the user can view the first content.

The control unit 118 controls the overall operation of the components of the color marker recognizing device 100 using control signals CS1 to CS4.

In the above description, the image collecting unit 110 is a component of the color maker recognizing device 100. However, the image collecting unit 110 may be installed as a separated device from the color marker recognizing device 100, and thus the images collected by the image collecting unit 110 may be transmitted to the color marker recognizing device 100 through a predetermined network.

Hereinafter, the operation process of the system for providing contents will be described in detail with reference to FIG. 3.

FIG. 3 is a flowchart illustrating an operation process of a system for providing contents according to an embodiment of the invention. The operation of the system for providing contents will be described in detail by exemplifying a case of providing a proper exercise program for a user who uses sporting goods.

Referring to FIG. 3, the image collecting unit 110 collects color marker images by photographing the color markers that are attached to the sporting goods (Step S300).

Then, the color selecting unit 120 selects a color corresponding to the user from the collected color marker images according to the contextual information on the user (Step S302). In this case, the contextual information includes physical information on the user, for example, information on the sex, age, and physique.

Then, the color separating unit 112 separates the sub marker image corresponding to the selected color from the collected color marker images and acquires the sub marker image (Step S304). That is, the color separating unit 112 acquires a sub marker image corresponding to a proper exercise method to recommend the proper exercise method for the user on the basis of the physical information on the user.

Then, the content unit 114 outputs a content demand signal that requests to provide a content corresponding to the acquired sub marker image, and the content server 102 outputs a content signal including the content corresponding to the sub marker image in response to the content demand signal (Step S306). That is, the content server 102 outputs the content signal that includes contents for the exercise method suitable for the user.

Then, the display device 104 or the content reproducing unit 116 displays the contents included in the output content signal such that the user can view the corresponding contents. For example, when a user who is in his fifties and has the height of 170 cm and the weight of 70 kg has an abnormal body fat, the display device 104 or the content reproducing unit 116 displays a moving picture suggesting that the user runs at the speed of 7 km/h for 15 minutes and at the speed of 5 km/h for 20 minutes, raises a weight material of 20 kg ten times by three sets, and does sit-ups twenty times, in order for the user to reduce the body fat with a help of the moving picture. As a result, the user can do exercise according to the exercise method suggested by the moving picture, and thus do exercise properly without a help of other people.

In brief, the system for providing contents according to this embodiment uses color markers that can represent information for many persons through a change in color, instead of the black-and-white markers that can represent information for a few of persons. Accordingly, the system for providing contents can provide personalized contents for a lot of individual persons, that is, personalized services for individual users, different from the system according to the related art.

FIG. 4 is a block diagram illustrating a system for providing contents according to another embodiment of the invention.

Referring to FIG. 4, a system for providing contents according to this embodiment includes a color marker recognizing device 400, a content server 402, and a display device 404.

The color marker recognizing device 400 includes an image collecting unit 410, a coloring unit 412, a content unit 414, an input unit 416, a content reproducing unit 418, and a control unit 420.

The image collecting unit 410 collects color marker images (MI), and transmits the collected color marker images (MI) to the coloring unit 412.

The coloring unit 412 separates a sub marker image (SMI) corresponding to a user from the collected color marker images (MI) according to contextual information on the user, and transmits the separated sub marker image (SMI) to the content unit 414.

The content unit 414 transmits, to the content server 402, a first content demand signal (first CTDS) that requests to transmit a content corresponding to the sub marker image (SMI) transmitted from the coloring unit 412.

The content server 402 transmits a first content signal (first CTS) including a first content corresponding to the sub marker image (SMI) to the content reproducing unit 418 in response to the first content demand signal (first CTDS) transmitted from the content unit 414.

The content reproducing unit 418 displays the first content that is included in the first content signal (first CTS). In this case, after viewing the displayed first content, the user may desire contents different from the first content. For example, although the user usually eats a hamburger in a restaurant, the user may desire to eat a pizza on the specific day. In this case, when the user photographs a color marker attached to a menu using the color marker recognizing device, the first content corresponding to the hamburger is displayed, and thus the user needs to change the first content to a content corresponding to the pizza.

In order to perform a content change, the input unit 416 inputs, to the content unit 414, input information requesting to change the first content to a different content.

The content unit 414 transmits a second content demand signal (second CTDS) to the content server 402 according to the input information.

The content server 402 transmits, to the display device 404, the second content signal (second CTS) that includes the second content different from the first content in response to the transmitted second content demand signal (second CTDS).

The display device 404 displays the second content included in the transmitted second content signal (second CTS). That is, an order command for the pizza corresponding to the second content can be transmitted to the display device 404 of a seller terminal.

In brief, the system for providing contents according to this embodiment is effective when the user desires to change the predetermined content.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

As described above, according to the embodiments of the invention, since the method of providing contents and the system for performing the same use the color marker, it is possible to provide personalized content services to individual users.

Further, since the method of providing contents and the system for performing the same can change the content set using the color marker to another content, it is possible to provide various content services using one color marker.

What is claimed is:

1. A color marker recognizing device comprising:
   an image collecting unit comprising an image collecting device configured to acquire a color marker image by photographing a color marker, the color marker image comprising a color marker frame disposed around the edges of the color marker and a plurality of figures, each figure comprising at least one color that is distinct from at least one color of every other figure;
   a coloring unit configured to acquire a sub marker image from the color marker image according to user contextual information, the sub marker image including a portion of at least one figure from the color marker; and
   a content unit configured to output a first content demand signal comprising a request to display a first content corresponding to the sub marker image acquired by the coloring unit;
   wherein the coloring unit is configured to select a predetermined color from the plurality of figures according to the user contextual information and separate the sub marker image corresponding to the selected color from the color marker image.

2. The color marker recognizing device of claim 1, further comprising:

a content reproducing unit configured to display the first content.

3. The color marker recognizing device of claim 2, further comprising:
an input unit configured to provide an input information request to change the first content displayed by the content reproducing unit to the content unit,
wherein the content unit is configured to output a second content demand signal comprising a request to display a second content different from the first content according to provided input information.

4. The color marker recognizing device of claim 2,
wherein the coloring unit further includes:
a color selecting unit configured to receive the color marker image from the image collecting unit and to select a predetermined color from the received color marker images according to the user contextual information; and
a color separating unit configured to receive the color marker images from the image collecting unit, to acquire a sub marker image corresponding to the color selected by the color selecting unit from the received color marker image, and to transmit the acquired sub marker image to the content unit.

5. The color marker recognizing device of claim 1,
wherein the content unit includes:
a marker recognizing unit configured to recognize the sub marker image transmitted from the coloring unit and to output a marker signal including information on the recognized result; and
a content requesting unit configured to analyze the marker signal output from the marker recognizing unit, and to output the first content demand signal according to the analyzed result.

6. The color marker recognizing device of claim 1, further comprising:
a memory that stores the contextual information.

7. A content server comprising:
a content storage unit configured to store one or more contents; and
a content personalizing unit configured to select a first content corresponding to a first content demand signal from the contents stored in the content storage unit,
wherein the first content demand signal includes information on a sub marker image collected by photographing a color marker that is acquired from a color marker image according to contextual information on a user, the color marker image comprising a color marker frame disposed around the edges of the color marker and a plurality of figures, each figure comprising at least one color that is distinct from at least one color of every other figure, and the sub marker image includes a portion of at least one figure from the color marker, and
wherein the sub marker image is acquired by selecting a predetermined color from the plurality of figures according to the contextual information and separating the sub marker image corresponding to the selected color from the color marker image.

8. The content server of claim 7,
wherein the content personalizing unit is further configured to provide a second content in response to a request to change the content, and to output a content signal including the second content.

9. The content server of claim 7,
wherein the content personalizing unit is further configured to generate a content signal including the selected first content, and to output the generated content signal.

10. The content server of claim 7,
wherein the first content demand signal includes positional information.

11. The content server of claim 7,
wherein the content personalizing unit is further configured to output a second content signal that includes a second content different from the first content in response to a second content demand signal, and
the second content demand signal includes a request to change the first content.

12. The content server of claim 7,
wherein the contextual information is stored in an external device that is separated from the content server.

13. A method of providing content using a color marker, the method comprising:
collecting a color marker image from a photograph of a color marker;
acquiring a sub marker image corresponding to a user from the collected color marker image according to contextual information on the user, the color marker image comprising a color marker frame disposed around the edges of the color marker and a plurality of figures, each figure comprising at least one color that is distinct from at least one color of every other figure, wherein the sub marker image includes a portion of at least one figure from the color marker; and
displaying a first content corresponding to the acquired sub marker image;
wherein the acquiring of the sub marker image includes:
selecting a predetermined color from the plurality of figures according to the contextual information; and
separating the sub marker image corresponding to the selected predetermined color from the collected color marker image.

14. The method of claim 13, wherein the acquiring of the sub marker image includes:
collecting a plurality of figures;
selecting a predetermined color from the plurality of collected figures according to the contextual information;
separating a sub marker image corresponding to the selected color from the plurality of figures; and
acquiring the sub marker image.

15. The method of claim 13, wherein the displaying of the first content includes:
recognizing the acquired sub marker image;
requesting to display the first content according to the recognized result; and
displaying the first content corresponding to the user and the sub marker image in response to the requesting.

16. The method of claim 13, further comprising:
requesting to display a second content different from the displayed first content; and
displaying the second content in response to the requesting.

17. The color marker recognizing device of claim 1, wherein first and second figures in a first color marker are colored with first and second colors, the color marker frame is colored with a frame color that is different from the first and second colors, and the frame color is separated from the first and second figures by a background color that is different from the first, second, and frame colors.

18. The content server of claim 7, wherein first and second figures in a first color marker are colored with first and second colors, the color marker frame is colored with a frame color that is different from the first and second colors, and the frame color is separated from the first and second figures by a background color that is different from the first, second, and frame colors.

19. The method of claim 13, wherein first and second figures in a first color marker are colored with first and second colors, the color marker frame is colored with a frame color that is different from the first and second colors, and the frame color is separated from the first and second figures by a background color that is different from the first, second, and frame colors.

* * * * *